US007743113B2

(12) United States Patent
Roseborough et al.

(10) Patent No.: US 7,743,113 B2
(45) Date of Patent: Jun. 22, 2010

(54) PROXY OPERATIONS ON CLIENT DEVICES

(75) Inventors: James Roseborough, Piedmont, CA (US); David Lowell, San Francisco, CA (US); Todd Stiers, Berkeley, CA (US)

(73) Assignee: MobiTV, Inc., Emeryville, CA (US)

( * ) Notice: Subject to any disclaimer, the term of this patent is extended or adjusted under 35 U.S.C. 154(b) by 113 days.

(21) Appl. No.: 11/542,683

(22) Filed: Oct. 2, 2006

(65) Prior Publication Data

US 2008/0082545 A1    Apr. 3, 2008

(51) Int. Cl.
*G06F 15/16* (2006.01)
*G06F 15/173* (2006.01)

(52) U.S. Cl. .................. 709/217; 709/227; 709/238
(58) Field of Classification Search ............ 709/203, 709/213–217, 227, 238
See application file for complete search history.

(56) References Cited

U.S. PATENT DOCUMENTS

| | | | | |
|---|---|---|---|---|
| 6,801,949 | B1 * | 10/2004 | Bruck et al. | 709/232 |
| 7,130,921 | B2 * | 10/2006 | Goodman et al. | 709/244 |
| 2002/0107701 | A1 * | 8/2002 | Batty et al. | 705/1 |
| 2003/0191868 | A1 * | 10/2003 | Espino | 709/328 |
| 2004/0122958 | A1 * | 6/2004 | Wardrop | 709/229 |
| 2004/0254887 | A1 * | 12/2004 | Jacoby | 705/52 |

OTHER PUBLICATIONS

"How to configure client proxy server settings by using a registry file", www.microsoft.com/kb/819961, downloaded Jun. 18, 2007.
"Generating a service proxy for the client", downloaded from IBM Corporation's website, copyright 2000, 2004.
"What is the client proxy", downloaded from Sybase, Inc. website, copyright 2002.
WO International Search Report, mailed Jun. 26, 2008, from International Application No. PCT/US07/79221, 2 pp.
WO Written Opinion of the International Searching Authority, mailed Jun. 26, 2008, from International Application No. PCT/US07/79221, 6 pp.

* cited by examiner

*Primary Examiner*—Hussein Elchanti
(74) *Attorney, Agent, or Firm*—Weaver Austin Villeneuve & Sampson LLP

(57) ABSTRACT

A client device is configurable to operate as a proxy for server operations. In particular examples, a back-end server performs transactions with a target server such as a vending server by using the client device as a proxy to allow transactions through the client device. The client device obtains from a back-end server logic information for communicating with the target server. The client device need not be configured with logic information to locate and communicate with any particular target entity.

27 Claims, 7 Drawing Sheets

| Logic Information 601 ||
|---|---|
| Directives 611 | Address information 613 |
| Parameters 615 | Reserved 617 |
| Error Handlers 619 | |

Figure 6

PROXY OPERATIONS ON CLIENT DEVICES

BACKGROUND OF THE INVENTION

1. Field of the Invention

The present disclosure relates to client/server and server/server operations. In one example, the disclosure describes using proxy operations on client devices.

2. Description of Related Art

Client devices interact with servers to perform a variety of operations. For example, mobile phones include applications that perform operations with billing servers in order to perform transactions. A mobile phone application may be used to add or remove subscriptions to services. Many different operations with billing servers may be involved. A mobile phone application is typically configured with information that allows the mobile phone application to interact with the billing server using a particular protocol.

However, techniques and mechanisms for allowing client device interaction with a server are limited. Consequently, it is desirable to provide additional techniques and mechanisms for performing client server operations.

SUMMARY OF THE INVENTION

A client device is configurable to operate as a proxy for server operations. In particular examples, a back-end server performs transactions with a target server such as a vending server by using the client device as a proxy to allow transactions through the client device. The client device obtains from a back-end server logic information for communicating with the target server. The client device need not be configured with logic information to locate and communicate with any particular target entity.

In one example, a technique is provided. Logic information is received from a back-end server at a client device. The client device runs an application supported by the back-end server. The logic information is associated with a request to a target server. A request to the target server is generated using the logic information. The request from the client device is transmitted to the target server. A response is received from the target server. The response corresponds to the request to the target server.

In another example, an apparatus including an output interface and an input interface is provided. The output interface is operable to send logic information to a client device. The client device runs an application supported by the apparatus. The logic information is associated with a request to a target server generated by the client device. The input interface is operable to receive a response from the client device. The response includes information the client device received from the target server.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

FIG. 6 is a diagrammatic representation showing a client device.

DESCRIPTION OF EXAMPLE EMBODIMENTS

Figure 1:
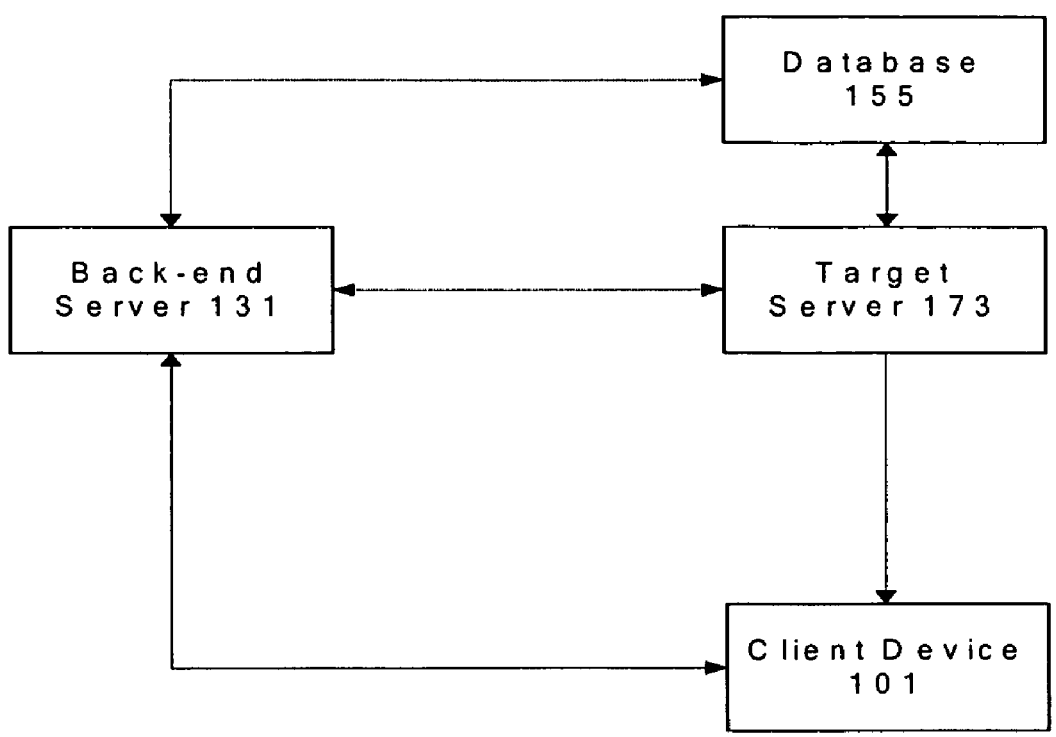
FIG. 1 illustrates a network that can use the techniques and mechanisms of the present invention.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of mobile devices and vending servers. However, it should be noted that the techniques of the present invention can be applied to a variety of different client devices and a variety of different target servers. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Furthermore, techniques and mechanisms of the present invention will sometimes be described in singular form for clarity. However, it should be noted that some embodiments include multiple iterations of a technique or multiple instantiations of a mechanism unless noted otherwise. For example, a processor is used in a variety of contexts. However, it will be appreciated that multiple processors can also be used while remaining within the scope of the present invention unless otherwise noted.

Target servers often need to be accessed by a variety of devices, including client devices and other servers. Client devices are often specifically configured to interact with particular target servers. In some examples, a mobile device application requires a substantial amount of logic and/or information before it can interact with a target server such as a vending server or a subscription server. Many processes may be required in order to add or delete subscriptions or portions of subscriptions. The processes may involve logic for handling error conditions, following redirection links, attempting reconnections, etc. Address information is needed to identify an appropriate target server. Consequently, many client devices are loaded with particular software that allows interaction with a target server. If the processes, logic, and/or information for accessing the target server change, the software on the client device can be upgraded or a patch can be installed. However, client devices such as mobile devices often have limited memory, limited processing capabilities, and may not have applications that can be readily upgraded or modified.

Other servers may also need to interact with the target server. In some instances, target servers have ports that allow access by any entity. However, more security may be required and the target server may only allow access by particular entities on particular ports. Special links can be set up in pair-wise fashion for security reasons. Alternatively, target servers can have special access arrangements or security precautions in place to allow only limited access. In the case of vending servers in cellular networks, access in many instances is only allowed for mobile handsets or mobile client devices configured to operate on the cellular network. In many examples, only a mobile phone having a particular security context can initiate transactions with a target server such as a vending server.

Consequently, the techniques and mechanisms of the present invention contemplate using a client as a proxy for back-end server operations. In one example, a back-end provides logic including information to a client device to allow a client device to access a target server. In another example, a mobile device initiates access to a target server but obtains logic information from a back-end server when access to the target server fails. The back-end server can also be used to process data obtained by a client device from a target server.

A client device need not have extensive processing or memory characteristics but can instead merely operate as a proxy for back-end server operations. A back-end server can access a target server through the client device. A client device can obtain logic information including protocol information, parameters, addresses, etc. from a back-end server as well as offload processing operations to the back-end server. A client device and a client application can remain simple. In some examples, the client application may handle only user interface and proxy operations. Logic information can be computed at run-time by a server. The logic information can be dynamically modified after the application code is built and installed on a client device.

FIG. 1 is a diagrammatic representation showing one example of a network that can use the techniques and mechanisms of the present invention. According to various embodiments, a client device 101 is connected to a back-end server 131 and a target server such as a vending server 173. In particular examples, a back-end server 131 is any device that dynamically provides a client device 101 with information to allow the client device 101 to run particular applications. In some examples, the client device 101 runs applications that entail interaction with a target server 173. A target server 173 may be a cellular network billing server that allows a mobile phone to subscribe and/or unsubscribe to services. In other examples, the target server 173 may be a financial services center that allows a computing device to access financial statements.

For any variety of reasons, it may be desirable for a back-end server 131 to use the client device 101 as a proxy for interacting with a target server such as the target server 173. In some examples, a client device 101 may have limited processing capabilities or have limited storage for applications. Consequently, the client device 101 uses the back-end server 131 to provide logic information for accessing the target server 173. Logic information can include address data to identify an appropriate target server, protocol information to determine what message formats to transmit or how many times to retransmit, or other logic for interacting with the target server 173.

In other examples, client devices may be numerous. If a target server 173 changes, it may not be efficient to modify every client device 101 so that communication with target servers 173 can proceed effectively. For example, it may not be possible to update every client device with a new address for a billing server in a cellular network. Consequently, updates can be made at a back-end server 131. In some examples, the back-end server 131 is accessed by a client device 101 if communication with a target server 173 fails. In other examples, the back-end server 131 controls operations of a client device 101. Numerous client devices are dynamically configurable to operate with a variety of target servers without having to individually modify the client devices.

In still other examples, it may be useful for a back-end server 131 to use the client device 101 as a proxy for performing operations with a target server because the target server such as target server 173 may be inaccessible. The target server 173 and an associated database 155 may only be accessible to a client device 101. For example, vending servers in cellular phone networks may only allow access from mobile devices having registered electronic identifiers. Consequently, if the back-end server 131 needs to obtain data from a target server 173 or data from a database 155, the back-end server performs operations through client device 101.

Some particular examples of applications where the techniques and mechanisms of the present invention are useful are broadcast media including broadcast video and audio, financial services, as well as human resources management. In broadcast media applications, a back-end server may be associated with a guide generator. The guide generator obtains information from disparate sources including content providers to generate program guides for broadcast video and audio.

According to various embodiments, media content is provided from a number of different sources. Media content may be provided from film libraries, cable companies, recording studios, movie and television studios, commercial and business users, etc. and maintained at a media aggregation server. Any mechanism for obtaining media content from a large number of sources in order to provide the media content to mobile devices in live broadcast streams is referred to herein as a media content aggregation server. In particular examples, the media content aggregation server is a video content aggregation server or an audio content aggregation server. The media content aggregation server may be clusters of servers located in different data centers. According to various embodiments, content provided to a media aggregation server is provided in a variety of different encoding formats with numerous video and audio codecs. Media content may also be provided via satellite feed.

The media content from media aggregation server is provided as live media to a streaming server. In one example, the streaming server is a Real Time Streaming Protocol (RTSP) server. Media streams are broadcast live from an RTSP server to individual client devices. A variety of protocols can be used to send data to client devices.

Although particular network entities and particular connections are shown, it should be recognized that a variety of entities can be used and a variety of configurations are possible. For the broadcast media example, although the client device is connected to a streaming server, various embodiments do not require streaming servers. Similarly, a guide generator may not be included or connected to back-end server. A back-end server 131 may have its own database or may be connected to target server 173 and associated database but may still elect to access the target server 173 through the client device 101. Alternatively, a variety of entities may exist between a back-end server 131 and a client device 101 or between a target server 173 and a client device 101. A variety of configurations are possible.

Figure 2:
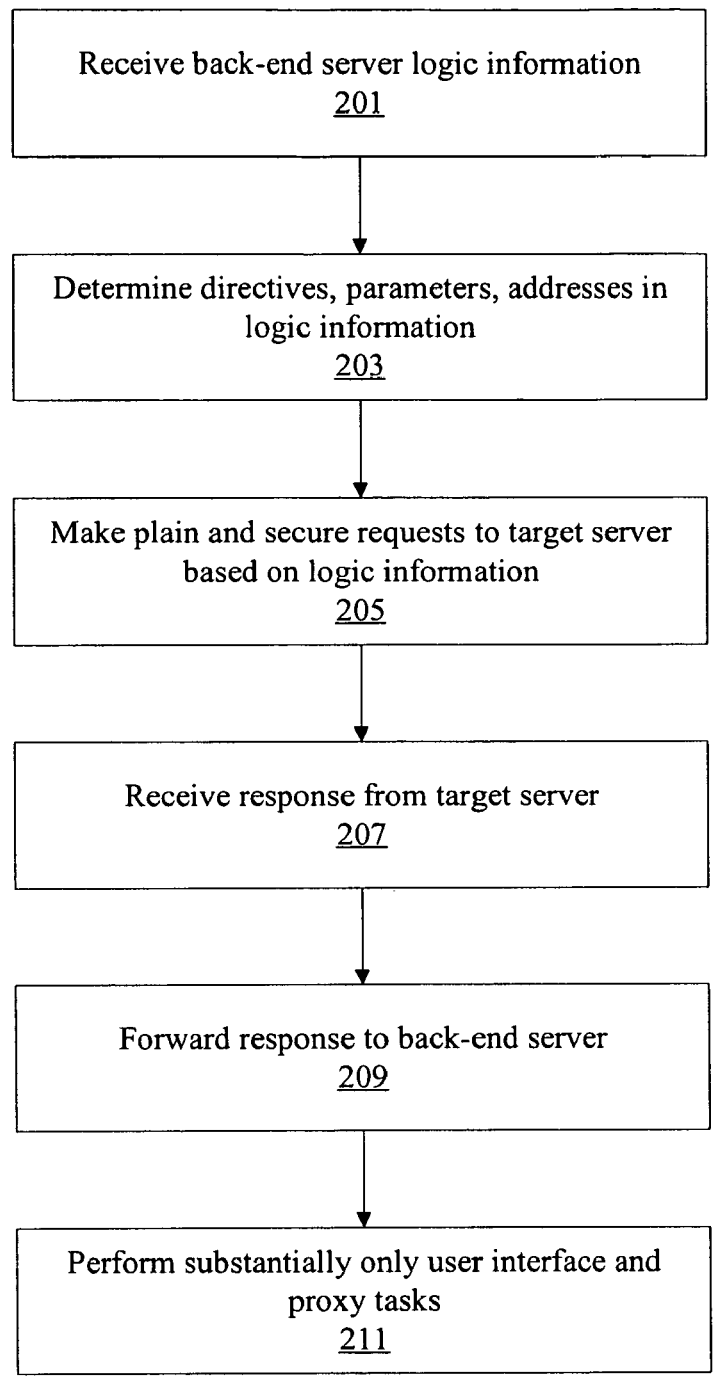
FIG. 2 is a flow process diagram showing a technique for using a client as a proxy.

FIG. 2 illustrates one example of a back-end server accessing a target server using a client proxy. According to various embodiments, the client device receives back-end server logic information at 201. It should be noted that receipt of back-end server logic information may be triggered initially by either a back-end server or a client device. At 203, logic information 203 is analyzed to determine contents such as directives, parameters, addresses, error handlers, etc. Directives included in logic information 203 indicate what commands should be sent by the client device to a target server. Parameters can be used to determine what type of information is included in a command or request, or how many retry attempts should be made for a particular request. Addresses can be used to identify target servers. Error handlers are provided to allow a client device to handle exceptions. A variety of data can be included in logic information. In some examples, logic information includes proxy instructions for communications with a target server.

At 205, the client device makes plain and secure requests to the target server based on logic information. According to various embodiments, the client carries out instructions using its own security context including any client side certificates needed to authenticate the transaction. At 207, a response or multiple responses is received from a target server. At 209, the target response can be forwarded to the back-end server. In some examples, logic information indicates whether the target responses should be forwarded to the back-end server. By having a back-end server provide logic information, a client device is allowed to perform substantially only user interface and proxy operations. Client devices with limited resources and limited configurability can dynamically communicate with a target server by using back-end server directives.

The following code provides a particular example of how proxy operations can be handled. In one example, a proxy can be used to send requests.

```
public void runRequest(String url) throws IOException {
    if (url.startsWith("http://"))
        runPlainRequest(url);
    else
        runSecureRequest(url);
}
public int getReponseCode( ) {
    return m__responseCode;
}
public String getReponseMessage( ) {
    return m__responseMessage;
}
public String getResponseHeader(String s) {
    int index = m__headerKeys.indexOf(s);
    if (index < 0)
        return null;
    return (String) m__headerValues.elementAt(index);
}
public byte[ ] getResponseBody( ) {
    return null;
}
In some particular examples, plain requests are sent.
private void runPlainRequest(String url) throws IOException {
    SocketConnection sc = null;
    InputStream is = null;
    OutputStream os = null;
    try {
        parseUrl(url);
        String proxy = "socket://"+m__proxyHost + ":" + m__proxyPort;
        if(DBG__LOGIC)info("opening '"+proxy+"'");
        sc = (SocketConnection) Connector.open(proxy);
        os = sc.openOutputStream( );
        is = sc.openInputStream( );
        writeRequest(os, "GET " + url + " HTTP/1.1\r\n" + "Host: " + m__urlHost + "\r\n" + "Connection: close\r\n" + m__extraHeaders + "\r\n");
        readResponse(is);
```

-continued

```
    } finally {
        close(is);
        close(os);
        close(sc);}
}
```

In other examples, secure requests can be proxied by a client device. A secure connection is created by opening a server socket and transmitting data through a secure tunnel.

```
private void runSecureRequest(String url) throws IOException {
    try {
        parseUrl(url);
        // http "CONNECT" phase
        String proxy = "socket://"+m__proxyHost + ":" + m__proxyPort;
        if(DBG__LOGIC)info("opening '"+proxy+"'");
        sc = (SocketConnection) Connector.open(proxy);
        os = sc.openOutputStream( );
        is = sc.openInputStream( );
        writeRequest(os, "CONNECT " + m__urlHost + ":" + m__urlPort + " HTTP/1.1\r\n" + "Host: " + m__urlHost + ":" + m__urlPort + "\r\n" + m__extraHeaders + "\r\n");
        readResponse(is);
        // check response
        if (m__responseCode != 200)
            return;
    A server socket is created during a secure request. A new accept thread is also created.
        if(DBG__LOGIC)info("creating server socket");
        ssc = (ServerSocketConnection) Connector.open("socket://:");
        if(DBG__LOGIC)info("created server socket at '"+ssc.getLocalAddress( )+":"+ssc.getLocalPort( )+"'");
        // create accept thread
        at = new AcceptThread( );
        if(DBG__LOGIC)info("created accept thread");
        at.start( );
        if(DBG__LOGIC)info("started accept thread");
    After the server socket is created, a client device connects to the server and writes a request through a secure tunnel. A response is then obtained.
        String tunnel = "ssl://127.0.0.1:" + ssc.getLocalPort( );
        if(DBG__LOGIC)info("opening '"+tunnel+"'");
        tsc = (SocketConnection) Connector.open(tunnel);
        tos = tsc.openOutputStream( );
        tis = tsc.openInputStream( );
        // write the request through the tunnel
        writeRequest(tos, "GET " + url + ":" + m__urlPort + " HTTP/1.1\r\n" + "Host: " + m__urlHost + ":" + m__urlPort + "\r\n" + "Connection: close\r\n" + m__extraHeaders + "\r\n");
        // get the decoded response
        readResponse(tis);
    } finally {
        closeAll( );
    }
}
```

Figure 3:
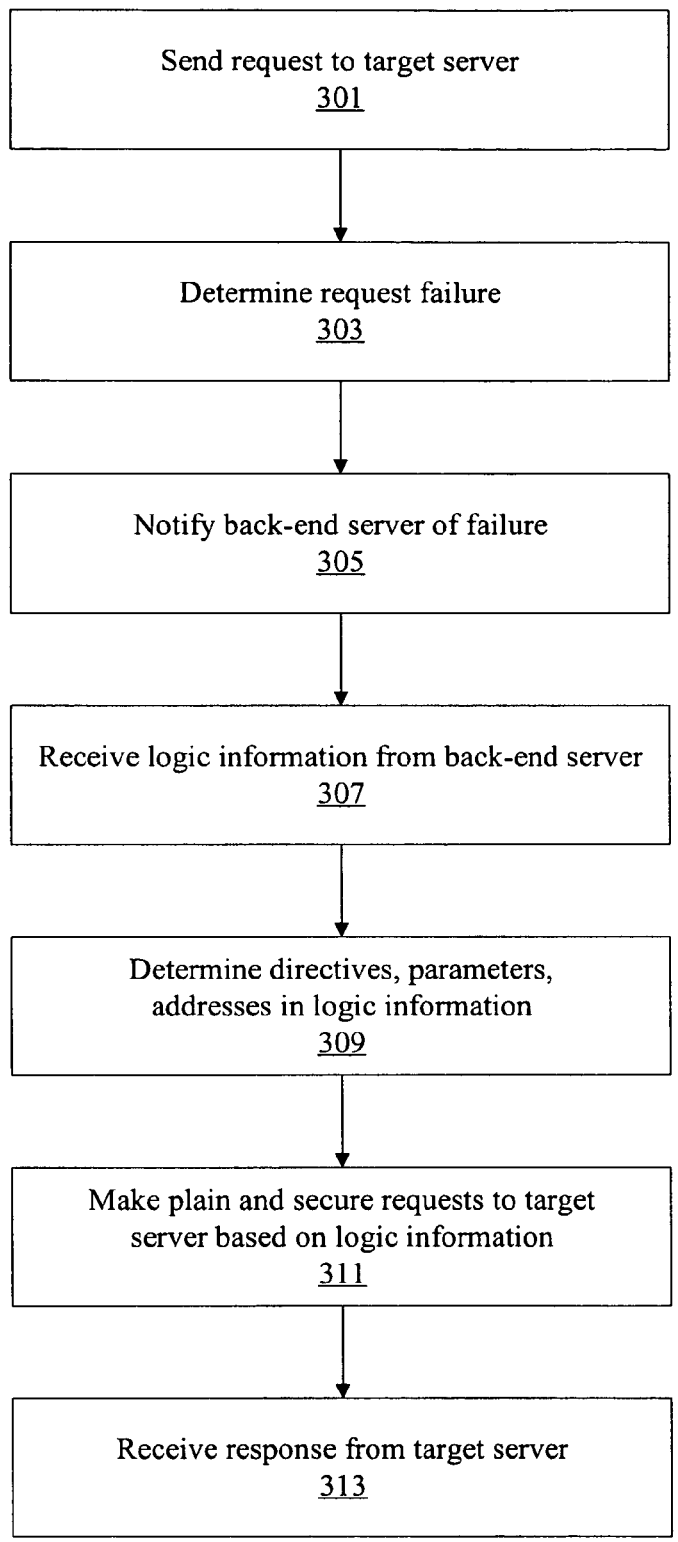
FIG. 3 is a flow process diagram showing a technique for using a client as a proxy.

FIG. 3 is a flow process diagram showing a technique for accessing a target server. According to various embodiments, a client device sends a request to target server 301. At 303, the client device determines that the request failed. In some examples, the client device may receive no response. Alternatively, it may receive an error message or some other fault or exception. At 305, the mobile device notifies the back-end server that a request has failed. Instead of providing error handling logic in a mobile device, error handling can be offloaded to a back-end server. The back-end server can dynamically compute error handling logic for the mobile device based on the most recent information available. In some examples, a back-end server address may have changed. Instead of updating all mobile devices, the back-end server is updated to reflect the change. Alternatively, there may be a change in the way a client device should interact with a target server. Again, instead of updating the client devices, a back-end server or a few back-end servers can be updated with this information.

At 307, the mobile device receives logic information from the back-end server. The logic information may include error handling code or address information or any other logic that the client device can use in its reattempt to access the target server. Other directives and parameters, etc. may also be determined if available at 309. At 311, the client device makes plain and secure requests to the target server based on logic information. According to various embodiments, the client carries out instructions using its own security context including any client side certificates needed to authenticate the transaction. At 313, the client receives a response from the target server 313.

In particular examples, a mobile phone is programmed prior to sale. In some instances, the mobile phone may be coded with a wrong address for a vending server. When a mobile phone application attempts to access the vending server to subscribe to a service or a portion of a service, the attempt fails because the address is incorrect. The mobile phone then accesses a back-end server associated with the mobile phone application. In some instances, the back-end server is associated with an entity that supports the application. The mobile phone does not need to be brought back to a point of sale to be reprogrammed. Alternatively, it does not need to be programmed with numerous vending server addresses. In many examples, it can simply be provided with a user interface and functionality to allow it to receive logic information from a back-end server. The back-end server can provide the mobile phone with a new address, as well as structure indicating the number of retry attempts.

Figure 4:
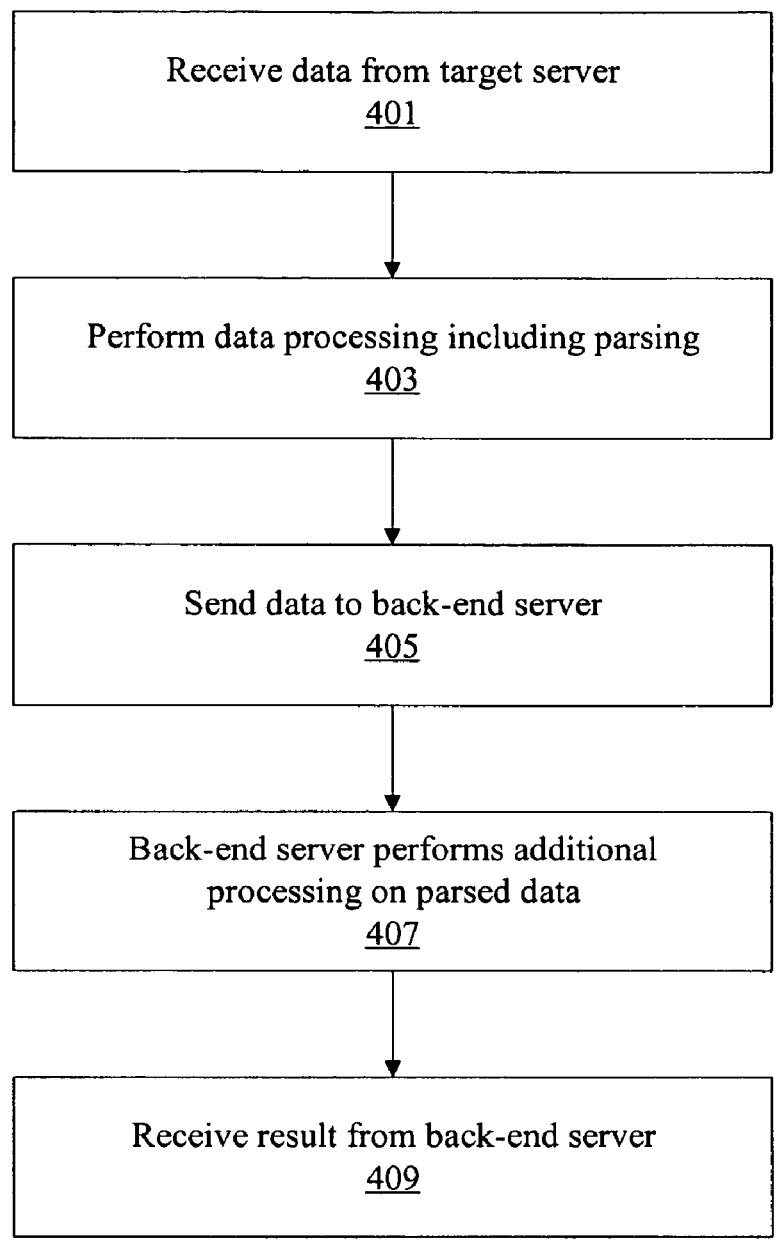
FIG. 4 is a flow process diagram showing a technique for using a client as a proxy.

FIG. 4 is a flow process diagram showing another technique that uses the client device as a proxy. At 401, a client device receives data from a target server. At 403, the client device performs processing of data. According to various embodiments, the client device may perform minimal processing or more extensive processing. In some examples, the client device performs parsing of data before sending the data to a back-end server at 405. The back-end server perform additional processing at 407. The processed results are received from a back-end server at 409.

In some examples, the back-end server performs processing to recognize contents of parsed data. In one example, a client device does not need to have any semantic understanding of data provided by a target server.

Figure 5:
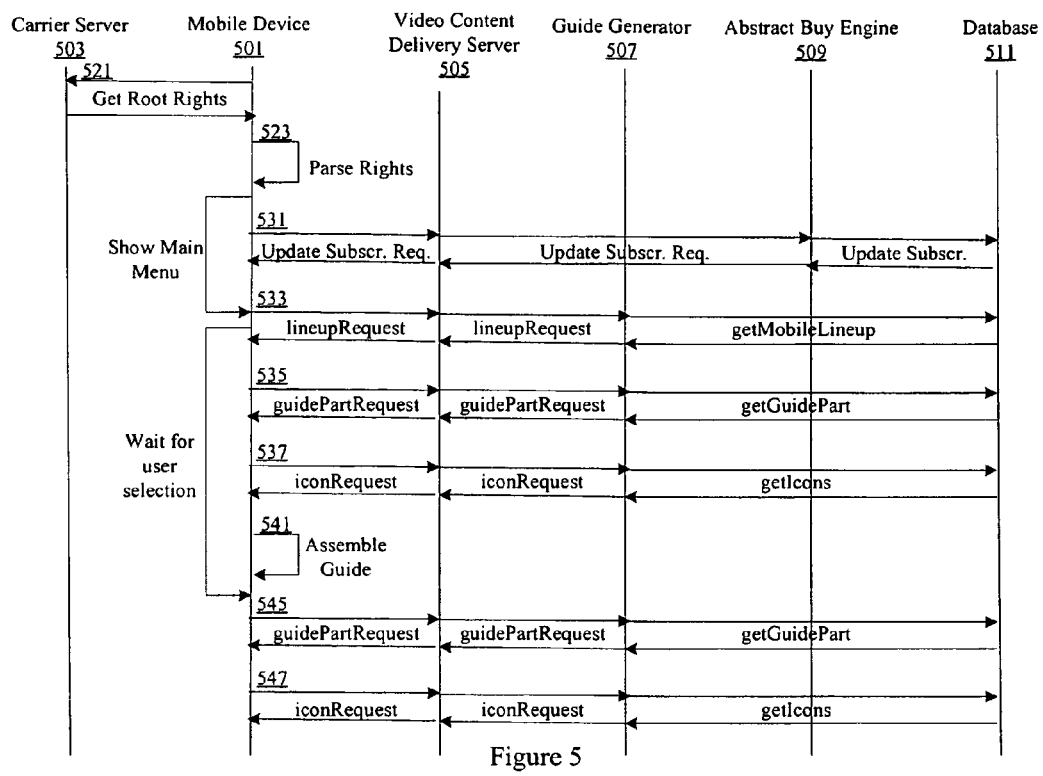
FIG. 5 is a diagrammatic representation showing logic information.

FIG. 5 is an exchange diagram showing one example of a client proxy used in the mobile telephone context. It should be noted that a wide variety of examples are possible, including examples that do not require mobile devices, subscription rights, etc. For example, the techniques of the present invention can also be applicable to client devices used in human resource management, financial services, medical records, etc. According to various embodiments, the techniques of the present invention can be applied to any system where a server is using a client as a proxy.

A mobile device 501 obtains descriptor information from a carrier server 503. In one example, descriptor information is subscription services/rights descriptor. The descriptor provides subscription and menu information to the mobile device 501. According to various embodiments, the mobile device parses information associated with the descriptor at 523. According to various embodiments, the mobile device merely parses the information associated with the descriptor. The mobile device then sends the descriptor to a back-end server 505 for additional processing to semantically understand the descriptor. The back-end server then sends back information to the mobile device so that the mobile device can display information such as subscribed services. In one example, a root menu showing subscribed and available channels is shown.

According to various embodiments, the mobile device 501 sends an update subscriptions request message at 531 to a back-end server 505. The back-end server 505 forwards the update subscriptions request message to an abstract buy engine 509. The abstract buy engine 509 sends an update subscriptions message to the database 511. The mobile device 501 also sends a lineup request message 535 to the back-end server 505. The lineup request message is forwarded to a guide generator 507. The guide generator obtains a lineup for the mobile device from the database 511. The abstract buy engine 509 is not involved in this particular request transaction. At 535, the mobile device sends a guide part request to the back-end server 505.

In some examples, icons are also requested by the mobile device 501 at 537. The mobile device 501 sends an icon request to the back-end server 505. The back-end server 505 forwards the icon request to the guide generator 507. The guide generator obtains icons from the database 511. According to various embodiments, other information such as advertisements and media clips are also requested or provided along with the icons. At 541, the guide is assembled at the mobile device 501.

FIG. 6 is a diagrammatic representation showing one example of logic information that can be provided to a client device. According to various embodiments, logic information 601 includes, directives 611, address information 613, parameters 615, reserved information 617, and error handling information 619. Directives 611 may include commands that a client device should issue. In some examples, the commands are issued using the client device's own security context. In other examples, the commands may be issued in plain text. Directives 611 may also be used to instruct the client device to perform a particular action, such as display a different user interface.

In some instances, directives 611 are a sequence of actions or commands. Examples of operations that could be directed by a server include parameterized plain http GET's and POST's as well as parameterized secure http GET's and POST's. The sending of short message service (SMS) messages to parameterized destinations with parameterized messages as well as the receiving of SMS messages according to supplied parameters can also be controlled using directives. Other common networking operations that may be restricted to the client can also be controlled using directives 611. Parameters 615 and reserved information 617 are used to provide additional information to a client device. Parameters 615 may be associated with directives. Address information 613 can be used to identify entities that the client device can interact with. Error handling information 619 can be used to instruct a client device on how to handle exceptions.

In some examples, a small number of directives can result in the client making a series of chained plain and secure HTTP requests that emulate most of the steps taken by a typical wireless application protocol (wap).

Figure 7:
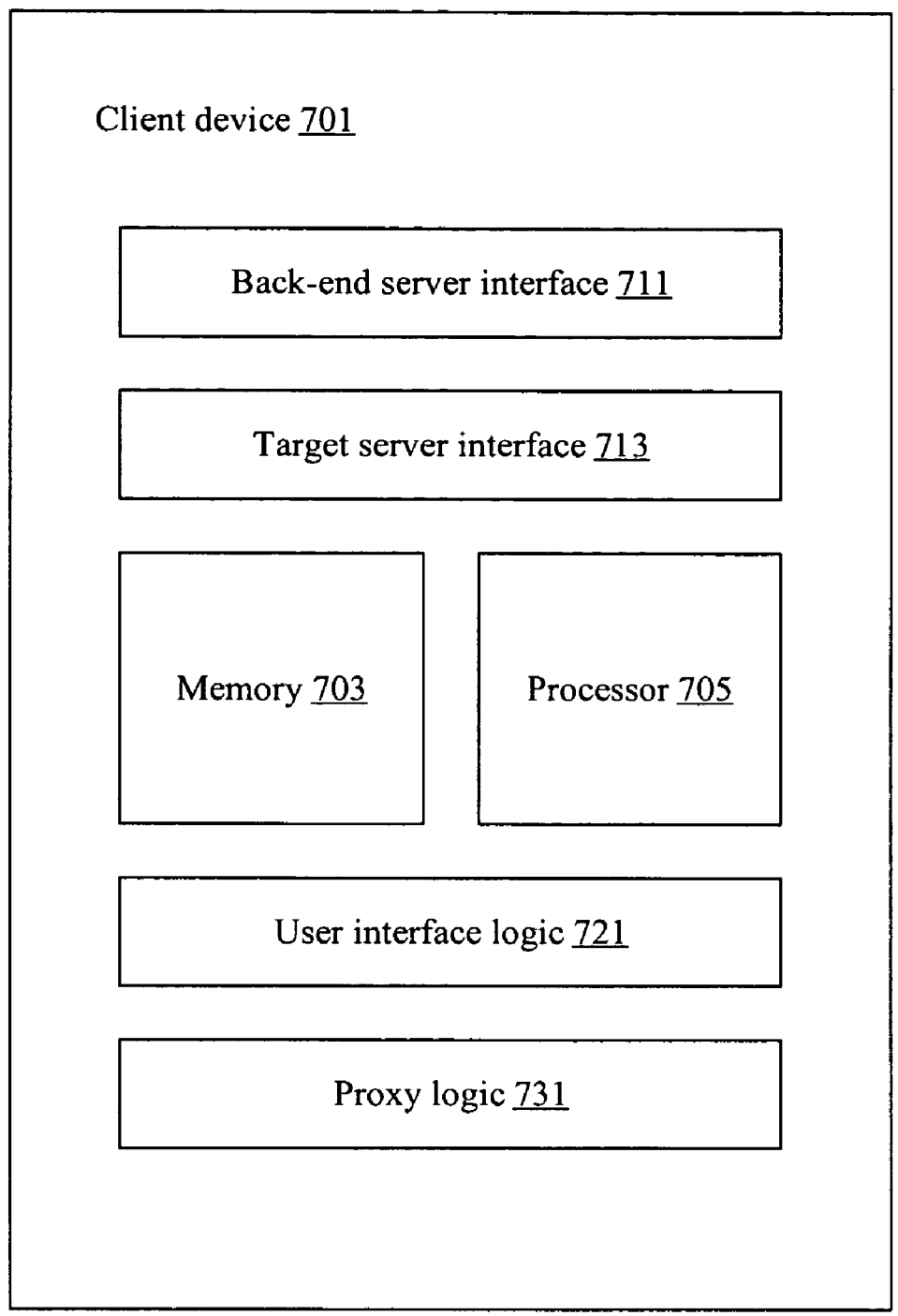
FIG. 7 is a flow process diagram showing server processing.

FIG. 7 is a diagrammatic representation showing one example of a client device. According to various embodiments, client devices include computer systems, mobile phones, personal digital assistants, portal computing devices, etc. The client device 701 includes a back-end server interface 711 and a target server interface 713. In some embodiments, the back-end server interface 711 and the target server interface 713 are the same interface. The client device 705 also includes a processor 705 and memory 703. Some client devices 705 may have limited processing capabilities and memory capacities. Consequently, it is useful to allow a back-end server to provide logic information to a client device. In some examples, the client device is configured to handle only user interface logic 721 and proxy logic 731. User interface logic 721 allows a user to interact with the client device. In some examples, user interface logic 721 may present menus or folders. Proxy logic 731 may include fundamental code allowing receipt of directives and other information from a back-end server.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method, comprising:
   receiving logic information from a back-end server at a client device, the client device running an application supported by the back-end server to perform proxy operations for the back-end server, the logic information associated with a request to a target server, the logic information comprising a directive and error-handling information for the client device;
   generating a request at the client device comprising a command to the target server based on the logic information, wherein the command is generated based on the directive;
   transmitting the request from the client device to the target server;
   receiving a response from the target server, the response corresponding to the request to the target server; and
   forwarding the response received from the target server to the back-end server based on the logic information received from the back-end server.

2. The method of claim 1, wherein the response from the target server is parsed at the client device.

3. The method of claim 1, wherein the request is a plain request.

4. The method of claim 1, wherein the request is a secure request.

5. The method of claim 1, wherein the client device is a cell phone with a registered electronic identifier in the cellular network and the target server is a cellular network billing server accessible to the cell phone based on verification of the registered electronic identifier and for providing subscription information to the cell phone and allowing the cell phone to subscribe and unsubscribe to services provided by the cellular network.

6. The method of claim 1, further comprising initiating an incorrect request and providing an error to the back-end server prior to receiving logic information from the back-end server.

7. The method of claim 1, wherein the request is a subscription request.

8. The method of claim 1, wherein the client device is a mobile device.

9. The method of claim 1, wherein the mobile device is operable to play a broadcast media stream.

10. The method of claim 1, wherein the target server is only accessible to the back-end server through the client device.

11. The method of claim 1, wherein the receiving a response from the target server is performed over a Real Time Streaming Protocol (RTSP).

12. The method of claim 1, wherein the response received from the target server comprises subscription information corresponding to the client device and wherein the subscription information is used by the back-end server to retrieve information for display on the client device.

13. The method of claim 1, wherein the logic information further comprises protocol information for determining a format of the response.

14. The method of claim 1 further comprising providing a new address of the target server to the back-end server and including the new address into the logic information.

15. The method of claim 1 further comprising attempting to initiate communication by the client device with the target server and requesting the logic information from the back-end server by the client device after the attempt to initiate communication by the client device with the target server fails.

16. The method of claim 1, wherein the back-end server comprises error-handling logic for dynamically computing the logic information that allows the cell phone to communicate with the target server.

17. An apparatus comprising:
    an output interface configured to send logic information to a client device comprising a directive and error handling information for the client device, the client device running an application supported by the apparatus to perform proxy operation for the apparatus, the logic information associated with a request comprising a command generated based on the directive to a target server generated by the client device;
    an input interface configured to receive a response from the client device, the response including information the client device received from the target server based on the logic information received from the apparatus.

18. The apparatus of claim 17, information received by the client device from the target server is parsed at the client device.

19. The apparatus of claim 18, further comprising a processor operable to further interpret the response.

20. The apparatus of claim 17, wherein the request by the client device to the target server is a plain request.

21. The apparatus of claim 17, wherein the request by the client device to the target server is a secure request.

22. The apparatus of claim 17, wherein the target server is a vending server.

23. The apparatus of claim 17, wherein the logic information is sent to the client device after the client device initiates an incorrect request to the target server.

24. The apparatus of claim 17, wherein the request is a subscription request.

25. The apparatus of claim 17, wherein the client device is a mobile device operable to play a broadcast media stream.

26. The apparatus of claim 17, wherein the client device is a mobile device operable to play a broadcast media stream.

27. A device, comprising:
    means for receiving logic information from a back-end server at a client device, the client device running an application supported by the back-end server to perform proxy operations for the back-end server, the logic information associated with a request to a target server, the logic information comprising a directive and error-handling information for the client device;

means for generating a request at the client device comprising a command to the target server based on the logic information, wherein the command is generated based on the directive;

means for transmitting the request from the client device to the target server;

means for receiving a response from the target server, the response corresponding to the request to the target server; and means for forwarding the response received from the target server to the back-end server based on the logic information received from the back-end server.

* * * * *